United States Patent Office 3,725,253
Patented Apr. 3, 1973

---

3,725,253
PROCESS FOR THE PURIFICATION OF MINERAL OIL
Shoji Yamada, Yokohama, Japan, assignor to Nippon Oil Company, Limited, Tokyo, Japan
No Drawing. Continuation-in-part of application Ser. No. 831,986, June 10, 1969. This application Dec. 7, 1971, Ser. No. 205,730
Claims priority, application Japan, June 25, 1968, 43/43,649
Int. Cl. C10g 23/00, 27/04
U.S. Cl. 208—211                          3 Claims

ABSTRACT OF THE DISCLOSURE

A process for the purification of mineral oil including a lube fraction comprising: reacting said mineral oil with oxygen-containing gases in the presence of at least one member selected from the group consisting of sulfuric acid and phosphoric acid as a catalyst at a temperature ranging from 180° C. to 280° C. thereby converting unstable compounds such as sulfur-containing compounds, oxygen-containing compounds, nitrogen-containing compounds, and organometallic compounds present in said mineral oil into compounds of greater molecular weight and increased polarity and separating said compounds from said mineral oil by vacuum distillation to obtain a refined mineral oil product, and further treating said refined mineral oil product in a fixed bed, suspension bed, or fluidized bed with a conventional hydrogenating catalyst under hydrogen pressure at a temperature ranging from 150° C. to 450° C.

---

RELATED APPLICATION

This application is a continuation-in-part of my application Ser. No. 831,986, filed June 10, 1969, now abandoned.

BACKGROUND OF THE INVENTION

(1) Field of the invention

This invention relates to a novel process for the purification of mineral oil containing lubricant fractions including impurites.

(2) Description of the prior art

It is already a well-known fact that mineral oil in general contains impurities such as various sulfur-containing compounds, oxygen-containing compounds, nitrogen-containing compounds, unsaturated organic compounds, organometallic compounds and the like and that these impurities greatly deteriorate the intrinsic properties of mineral oil. That is to say that these impurities are essentally unstable, so that when such mineral oil is employed as raw material for the production of lubricating oil, a variety of chemical reactions are caused depending on the conditions under which it is used, with a result that the physical as well as chemical properties of the lubricating oil are sometimes degraded.

Prior arts relating to the subject matter of the present invention may be summarized as follows:

U.S. Pat. No. 3,394,200 to Sargent discloses a method for removing olefins, nitrogen compounds and sulfur compounds contained in light hydrocarbons such as hexane by oxidizing these contaminants with ozone to give oxidized compounds thereof and removing the resulting oxidized compounds by way of adsorptive filtration.

U.S. Pat. No. 1,910,734 to Youker discloses a process for subjecting unsaturated hydrocarbons and mercaptans contained in cracked gasoline to an oxidative treatment with oxygen.

Both these prior arts of Sargent and Youker describe the purification of light hydrocarbons. Similarly, U.S. Pat. No. 607,017 to Calin discloses a process wherein sulfur compounds contained in crude oil are oxidized by peroxide and the resulting oxidized sulfur compounds are removed by distillation.

In the U.S. Pat. No. 3,284,342 to Nathan et al. and the U.S. Pat. No. 3,163,593 to Webster et al., sulfur compounds contained in oils are oxidized by a peroxide-containing oxidant and the resulting oxidized sulfur compounds are selectively decomposed by heating at temperatures ranging 350–400° C. and removed in the form of volatile sulfur compounds.

U.S. Pat. No. 3,341,448 to Ford et al. supplements a hydrogenation purification step to the technique of Nathan et al. or Webster et al.

These prior art processes referred to above, however, have not been practised on a commercial scale because of the fact that the treatment of unsaturated compounds and sulfur compounds contained in hydrocarbons with oxygen or peroxide involved in these processes affords only quite poor selectivity in removing these impurities and leads to undesirable brownish coloration of the treated hydrocarbons with attendant degradation in commercial value of the product.

The oxidation of sulfur compounds in hydrocarbons with a peroxide-containing oxidant followed by thermal decomposition of the oxidized sulfur compounds as proposed in Nathan et al., Webster et al. and Ford et al. gives products only in poor yields and purity, since not necessarily all of oxidized sulfur compounds are converted to volatile sulfur compounds. The incorporation of a hydrogenation purification step as proposed by Ford et al. has a disadvantage in that such a purification step be necessarily carried out under severe reaction conditions.

In contrast, the present invention enables the production of highly refined mineral oil in high yields free from drawbacks of the prior art in the poor selectivity and undesirable coloration and deterioration of the product with a much simplified hydrogenation purification step by the process which comprises subjecting impurities involved in mineral oil containing a lube fraction to a treatment with oxygen or air to cause oxidation, polymerization and/or condensation reactions so as to selectively turn the impurities into pitch-like high molecular weight compounds, separating the resulting high molecular weight compounds by ditsillation under a reduced pressure to obtain a refined mineral oil product and further subjecting the resulting refined mineral oil product to a hydrogenation purification treatment.

SUMMARY OF THE INVENTION

In the oxidation process for oxidizing impurities such as sulfur compounds adopted in the prior art processes described above, the selectivity and economy are quite poor.

The present invention has its basis on a novel finding that when impurities contained in mineral oil are oxidized in the presence of oxygen or air at a temperature of from 180° C. to 280° C. with an addition of 0.1–5.0% by weight of sulfuric acid and/or phosphoric acid based on the weight of mineral oil, these impurities are highly selectively oxidized and subsequent removal of these oxidized products by a vacuum distillation followed by a hydrogenation purification gives an excellent base oil for the production of a lubricating oil.

As is well known, there are an extremely large variety of sulfur-containing compounds contained in mineral oil as impurities. Typical ones of these are alkyl and aryl sulfide, straight chain or cyclic sulfides, mercaptans, thiophenols, thia - cyclopentanes, thiophenes, dibenzothiophenes and benzonaphthothiophenes and the like, and compounds having thiophene ring. The former of these, the sulfides, mercaptans and thiophenols are especially so unstable that when the mineral oil containing these are employed as raw material for the production of lubricating oil and when the lubricating oil thus produced is put to various applications, these impurities are easily decomposed into radicals, part of which are radical-polymerized and auto-oxidized to become sulfoxide and sulfone and, further causing polymerization, degrade the quality of the lubricating oil. The latter, the thiophenes, is relatively stable as compared with the former and some of them are admittedly effective as radical scavenger and antioxidant. But when the lubricating oil is used under considerably severe conditions, almost all of them become sulfoxide and sulfone and cause cyclic polymerization, further bringing about reactions such as condensation and polyaddition with oxygen-containing impurities such as phenols described hereinafter and aldehydes produced by oxidization of hydrocarbon, thereby degrading the quality of the lubricating oil.

It is also a known fact that the nitrogen-containing compounds contained in mineral oil as impurities can be classified into a great many varieties. Typical ones of these are pyrrols, indoles, carbazoles, pyridines, quinolines, isoquinolines, benzoquinolines, acridines, porphines, dihydropyridines, tetrahydropyridines, anilines, nitriles, amides, etc. The main constituent of these nitrogen-containing impurities is the compound of a heterocyclic structure having a pyrrol ring and pyridine ring, the former of which, the pyrrols, is a non-basic nitrogen compound and the latter is a typical one of basic nitrogen compounds. Generally, these compounds are so unstable that they are oxidized and colored by being merely left in the air. When lubricating oil is made from the mineral oil containing these nitrogen-containing impurities and used for various applications, N=O bond generated by oxidation adversely affects polymerization and reactions such as condensation and polyaddition with phenols described hereinafter and aldehydes generated by the air oxidization of hydrocarbon, becoming a predominant cause for the degradation of the quality of the lubricating oil. Also, in case mineral oil containing lubricant fractions is purified by the hydrogenation process, these nitrogen-containing compounds are deposited on the surfaces of catalysts through polymerization and condensation and thus become one of the causes for decrease in activity of the catalysts.

It is another known fact that the oxygen-containing compounds contained in mineral oil as impurities include fatty acids, naphthenic acids and phenols. When lubricating oil is made from these kinds of mineral oil and put to various applications, these oxygen-containing compounds cause reaction such as condensation and polyaddition with the mentioned sulfur-containing compounds, nitrogen-containing compounds and the compounds produced by the oxidization thereof, thereby degrading the quality of the lubricating oil.

Also various kinds of unsaturated organic compounds having unstable unsaturated bonds are present in mineral oil, causing the degradation of the quality of the lubricating oil produced therefrom.

The process according to the present invention makes it possible to obtain stable mineral oil which can be turned into lubricating oil or lubricating oil material stable and superior in quality because unstable impurities originally present in the mineral oil such as sulfur-containing compound, nitrogen-containing compound, oxygen-containing compound, unsaturated organic compound, organometallic compound and the like are efficiently eliminated therefrom.

Mineral oil containing lubricant fractions in this invention refers to various oils of a coal family, various oils obtained from shale oil and sand oil, crude oil of a petroleum family, fractions obtained by applying atmospheric or vacuum distillation thereto, and various oils obtained by purifying said fractions by ordinary processes.

According to this invention, the mineral oil containing the foregoing impurities and also including lubricant fractions is subjected to oxidation and/or polymer-producing treatments such as condensation, polymerization, oxidative condensation, etc.

The oxidation and the accompanying reactions are effected by treating the mineral oil at a temperature of from 180° C. to 280° C. in the presence of sulfuric acid and/or phosphoric acid as a catalyst with the addition of an oxidizing agent such as oxygen-containing gases, e.g., air and gaseous oxygen, to substantially oxidize the impurities contained in the mineral oil.

For instance, when a small quantity of phosphoric acid as a catalyst is added to mineral oil in accordance with the present invention and the mineral oil is treated for approximately one hour by charging air at 250° C., the impurities contained in the mineral oil are simultaneously or successively subjected to such reactions as oxidation, condensation, polymerization, oxidative condensation polymerization, with a result that a product having an increased molecular weight and/or higher polarity than said impurities is produced.

In carrying out the reactions mentioned above, if the reaction temperature is lower than 180° C. the effect of the present invention will not be fully demonstrated because of unsatisfactorily low rate of reaction, while if it exceeds 280° C. a decrease in yields will result due to deterioration of the mineral oil. Although no particular restriction is imposed on the reaction pressure, a high pressure is preferable in that it accelerates the rate of reaction. In adding sulfuric acid and/or phosphoric acid, the amounts of 0.1–5.0% by weight based on the weight of mineral oil are sufficient to obtain good results.

First distillation can be effected under reduced pressure by the use of a conventional packed tower or plate tower. A stripping process such as steam distillation can also be used. The operating conditions of the tower such as temperature and pressure are determined depending on the kind of mineral oil employed as raw material. The compounds produced in oxidation and/or polymer-producing treatment are separated from a lower portion of the tower.

Said separated products due to polymer-producing reaction are usually dark brown-colored and pitch-like compound which is put to various useful applications without being discarded.

The mineral oil containing lubricant fractions and having been refined by the above vacuum distillation is free from impurities, stable, and superior as base oil for lubricating oil, so that said mineral oil can be applied for various uses without trouble. But according to its applications, the conventionally known and used treatment for purification may be applied to said mineral oil in case a lubricating oil of a more superior quality is required. The processes for purification employed in this instance include hydrogenation, chemical washing and solvent purification, of which hydrogenation is especially recommendable.

Purification by hydrogenation in this process in the present invention has clear differences from the case where mineral oil is directly hydrogenated for purification in the following points, namely, that deactivation of catalyst is hard to occur and the lifetime of the catalyst is longer as compared with said case in which mineral oil is directly hydrogenated for purification, and that even the mineral oil which cannot be purified by direct hydrogenation can be purified more completely according to the processes of the present invention.

The hydrogenation in this purifying process of the invention is to stabilize the impurities left in the mineral oil which has been improved in color and subjected to said oxidation and/or polymer-producing treatment and further to separation treatment, and the hydrogenation is not aimed at converting the impurities such as sulfur-, nitrogen- and oxygen-containing compounds and the like into hydrocarbon through complete hydrogenation. Ordinary purification by hydrogenation is sufficient, that is, treatment with a fixed bed, suspension bed or fluidized bed by the use of various known hydrogenating catalysts under hydrogen pressure at a temperature between 150°–450° C. depending upon the kind of mineral oil employed. The impurities still left after effecting said hydrogenation can cause no harmful effects when the lubricating oil is used in various applications.

It is of course possible according to this invention to obtain base oil of lubricating oil by purifying lubricant fractions employed as raw material, and it is also possible to effect similar purification even in case mineral oil containing lubricant fractions is employed as material.

The make-up of this invention has been described in the foregoing, and the characteristics of the invention are further clarified in the following:

(1) Stable and superior lubricating oil can be obtained even from mineral oil which contains a large quantity of unstable components as impurities and which can hardly be purified to any satisfactory degree by conventional processes.

(2) The process according to the invention is applicable even when mineral oil employed as raw material is heavy, has a high percentage of aromatics content.

(3) Any large quantity of solvents and chemicals and costly installations are not necessary, but more superior mineral oil for purification is obtainable.

(4) The degree of removal of the unstable impurities can be determined by controlling the variables such as, e.g., reaction temperature, type and amount of the catalyst, reaction period, types and amounts of the oxidizing agent. Thus, purified oil of the desired degree of stability can be obtained.

(5) Naphthene-aromatic oil is obtainable by purifying, according to the process of the present invention, the solvent-purification extract oil which it has been almost impossible to purify.

(6) According to the invention, the oil containing lubricant fractions can be made through the purification of various kinds of oil obtained from coals, shale oil, sand oil, crude petroleum oil, fractions made by atmospheric or vacuum distillation, and various kinds of oil obtained by purifying said fractions according to conventional process. Especially, it is more effective to purify raffinates or extracts obtained by solvent refining according to this invention.

(7) There is little quantity of products due to decomposition, and further there is no waste produced in case the separation treatment in this invention is made by distillation, so that the process of this invention is not only economically advantageous but can cause no public hazards.

DESCRIPTION OF THE PREFERRED EMBODIMENTS

Given below are some examples of the present invention to which the scope of the invention is not to be restricted.

EXAMPLE 1

In producing a lubricating oil having a viscosity index of 85 from fractions corresponding to SAE-30 obtained through a vacuum distillation of a residual oil produced in an atmospheric distillation of Arabian crude oil, there was obtained through a solvent extraction employing furfural an extract in the yield of about 27% by weight. The extract whose properties were as shown in the following Table 1 was used as a material oil.

To the material oil was added 1.5% by weight of phosphoric acid based on the weight of the material oil and there was blown into the material oil 0.5 kl. NTP of air per kg. of the material oil. The resulting mixture was maintained at 255° C. to carry out the reaction for four hours. In this instance, there was observed no substantial decomposition of the material oil though there was produced steam with flowing out of some oil vapor.

There occurred the oxidation and accompanying polymer-forming reactions of unstable components of the material oil to produce a black, semi-solid reaction product. The oil thus treated was subjected to a vacuum distillation by reducing the pressure down to 1 mm. Hg and there were obtained 61% by weight of a red, transparent oil as a distillate and 38% by weight of a residual oil as a bottom. The residual oil was a pitch-like matter in a lustrous black-brownish color and had a softening point of 50° C., a penetration at 25° C. of 40, a ductility at 25° C. of 150(+) and a bromine number of 25.8.

The distillate obtained in the vacuum distillation was further subjected to a hydrogenation treatment to remove therefrom oxidized products produced mainly by the oxidation reaction, as well as to improve the color phase of the product. The hydrogenation treatment was carried out with the use of a commercially available Ni-Mo catalyst (HDS–3) as a hydrogenation catalyst under reaction conditions including a hydrogen partial pressure of 50 atmospheres, a reaction temperature of 300° C. and a LHSV of 1 vol./vol./1.

Subsequently, nitrogen gas was allowed to pass through the product oil thus hydrogenated to completely purge therefrom gaseous matter and there was obtained a refined oil of pale yellowish color.

As a Comparative Example 1, the same extract oil used as the starting oil in the foregoing Example 1 was directly subjected to the hydrogenation treatment under the same reaction conditions as in Example 1. In this instance, there was detected adhering of matter on the surface of the catalyst immediately after the initiation of the reaction and the catalyst showed a clear tendency towards gradual deterioration in its catalytic activity.

The reaction results of Example 1 and Comparative Example 1 were as summarized in the Table 1. The Table 1 clearly shows that Example 1 is superior to Comparative Example 1 in the terms of the color phase, residual carbon, viscosity index and contents of sulfur and nitrogen.

TABLE 1

| Oils | Material extract oil | Example 1 Distillate in vacuum distillation | Example 1 Hydrogenated distillate oil | Comparative 1, hydrogenated material extract oil |
|---|---|---|---|---|
| Specific gravity, $d_4^{20}$ | 1.0401 | 1.0246 | 1.0178 | |
| Pour point, °C | 12.5 | 5.1 | –2.5 | |
| Flash point, °C | 258 | 254 | 264 | |
| Color phase (UNION) | dil7(–) | 8(–) | 3½(–) | 7(–) |
| Residual carbon, wt. percent | 8.69 | 3.44 | 2.93 | 4.88 |
| Viscosity at: | | | | |
| 37.8° C | 7,963 | 1,151 | 1,265 | 1,397 |
| 98.9° C | 57.4 | 24.33 | 26.10 | 48.36 |
| Viscosity index | –154 | –80 | –70 | –125 |
| Molecular weight | 440 | 414 | 372 | |
| Elementary analysis, percent: | | | | |
| C | 84.2 | | 83.5 | |
| H | 9.2 | | 10.3 | |
| S | 6.07 | 5.54 | 5.02 | 5.52 |
| N | 0.15 | 0.11 | 0.09 | 0.09 |
| Aniline point, °C | 22.4 | 30.0 | 29.9 | |
| Acid number, mg.-KOH/g | 0.34 | 0.32 | 0.00 | |
| Base number, mg.-KOH/g | 0.33 | 0.03 | 0.03 | |
| Bromine number, g.-Br/100 g | 7.3 | | 7.0 | |
| Refractive index, $n_d^{20}$ | 1.5977 | 1.5885 | 1.5837 | |

EXAMPLE 2

Fractions corresponding to SAE-30 obtained by a vacuum distillation of a residual oil produced in an atmospheric distillation of Arabian crude oil were employed as a material oil.

To the material oil was added 2.0% by weight of sulfuric acid based on the weight of the material oil and there was blown into the material oil 0.2 kl. NTP of air per kg. of the material oil. The resulting mixture was maintained at 270° C. to carry out the reaction for two hours. In this instance, there was observed no substantial decomposition of the material though there was produced steam with flowing out of some oil vapor.

The reaction product was a black viscous matter which was uniformly distributed in the oil. The reaction mixture was then subjected to a vacuum distillation under a pressure of lower than 1 mm. Hg. There were obtained in a yield of 76% by weight a red brownish transparent oil as a distillate and a black, semi-solid, viscous matter in a yield of about 24% by weight as a bottom.

The distillate produced in the vacuum distillation was further subjected to a hydrogenation treatment employing the same catalyst and reaction conditions as in Example 1. The results were as summarized in the Table 2. The Table 2 clearly shows that the process of the present invention is an excellent refining process capably affording satisfactory color phase and minimized residual carbon and contents of sulfur and nitrogen.

TABLE 2

| | | Example 2 | |
|---|---|---|---|
| Oils | Material oil | Distillate in vacuum distillation | Hydrogenated distillate oil |
| Specific gravity, $d_4^{20}$ | 0.9532 | 0.9410 | 0.9375 |
| Pour point, °C | −17.5 | −18.0 | −19 |
| Flash point, °C | 258 | | |
| Color phase (UNION) | dil 4½(−) | 7(−) | 2½(−) |
| Residual carbon, wt. percent | 2.63 | 1.21 | 0.73 |
| Viscosity (cst.) at: | | | |
| 37.8° C | 443.5 | 275.1 | 230.5 |
| 98.9° C | 191.7 | 41.5 | 15.40 |
| Viscosity index | 49 | 53 | 63 |
| Molecular weight | | | |
| Elementary analysis, percent: | | | |
| C | 83.7 | 83.7 | 84.2 |
| H | 11.2 | 11.7 | 13.3 |
| S | 3.48 | 2.90 | 2.21 |
| N | 0.06 | 0.04 | 0.02 |
| Aniline point, °C | 77.6 | 79.5 | 81.5 |
| Acid number, mg.-KOH/g | 0.05 | 0.03 | 0.02 |
| Base number, mg.-KOH/g | 0.14 | 0.11 | 0.03 |
| Bromine number, g.-Br/100 g | 2.1 | 2.1 | 1.7 |
| Refractive index, $n_d^{20}$ | 1.5632 | 1.5428 | 1.5269 |

EXAMPLE 3

In producing a lubricating oil having a viscosity index of 100 from fractions corresponding to SAE-20 obtained through a vacuum distillation of a residual oil produced in an atmospheric distillation of Minas crude oil, there was obtained through a solvent extraction using furfural an extract oil. This extract was used as a material oil.

To the material oil was added 2.0% by weight of phosphoric acid based on the weight of the material oil and there was blown into the material oil 0.4 kl. NTP of air per kg. of the material oil and the reaction was carried out for two hours at a reaction temperature of 220° C., followed by a vacuum distillation.

There was obtained a distillation oil in a yield of 85% by weight, which was then subjected to a hydrogenation treatment with the use a commercially available Co-Mo Hydrobon S-3 catalyst under reaction conditions including a reaction temperature of 290° C., a hydrogen partial pressure of 50 kg./cm.² and a LHSV of 1 vol./vol./hr.

As a Comparative Example 2, the oxidation treatment, the vacuum distillation and the hydrogenation treatment were repeated according to the same procedures and under the same conditions as described above except that no phosphoric acid was added. The reaction results were as tabulated in the Table 3.

Comparison of the properties of the distillate of Example 3 with those of the distillate of Comparative Example 2 reveals the superiority of Example 3 over Comparative Example 2 in terms of the color phase, residual carbon and contents of sulfur and nitrogen, clearly substantiating the outstanding catalytic effect of phosphoric acid.

TABLE 3

| | | Example 3 | | Comparative 2 | |
|---|---|---|---|---|---|
| Oils | Material oil | Distillate in vacuum distillation | Hydrogenated distillate oil | Distillate in vacuum distillation | Hydrogenated distillate oil |
| Specific gravity, $d_4^{20}$ | 0.957 | 0.949 | 0.045 | 0.952 | 0.948 |
| Pour point, °C | −12.5 | −14.5 | −17 | −13.5 | −15.1 |
| Flash point, °C | | | | | |
| Color phase (UNION) | dil 6(−) | 6(−) | 2½(−) | 8(−) | 3½(−) |
| Residual carbon, wt. percent | 0.45 | 0.15 | 0.17 | 0.28 | 0.21 |
| Viscosity index | −53 | −44 | −25 | −47 | −38 |
| Aniline point | 63.0 | 70.4 | 78.4 | 65.2 | 71.5 |
| Refractive index, $n_D^{20}$ | 0.5410 | 1.5304 | 1.5294 | 1.5356 | 1.5342 |
| Viscosity, cst., at: | | | | | |
| 37.8° C | 416.7 | 311.3 | 298.5 | 361.5 | 315.2 |
| 98.9° C | 14.96 | 12.96 | 11.54 | 14.25 | 11.91 |
| Elementary analysis, percent: | | | | | |
| S | 0.81 | 0.27 | 0.13 | 0.52 | 0.25 |
| N | 0.17 | 0.09 | 0.02 | 0.13 | 0.09 |

EXAMPLE 4

Example 1 was repeated according to the same procedures and employing the same material oil and reaction conditions as described therein except that sulfuric acid was used as a catalyst in various amounts of 0.1 wt. percent, 0.5 wt. percent, 1 wt. percent, 3 wt. percent and 5 wt. percent based on the weight of the material oil used. The results are shown in Table 4.

As can be noted from the Table 4, as the amounts of catalyst used increase, the values of color phase, residual carbon and contents of sulfur and nitrogen decrease, showing a clear tendency towards enhancement in the degree of purification. The fact that there is seen no particular changes in the properties of the product even though the amount of catalyst is increased from 3 wt. percent to 5 wt. percent shows that very little improvement in the effect will be accomplished even when the catalyst is used in amounts exceeding 5.0 wt. percent.

TABLE 4

| Amount of $H_2SO_4$ added (wt. percent) | 0.1 | 0.5 | 1 | 3 | 5 |
|---|---|---|---|---|---|
| Specific gravity, $d_4^{20}$ | 1.0192 | 1.0175 | 1.0173 | 1.0171 | 1.0171 |
| Pour point, °C | −1.3 | −3.1 | −3.8 | −4.5 | −4.7 |
| Flash point, °C | 262 | 265 | 264 | 266 | 265 |
| Color phase (UNION) | 3½(−) | 3½(−) | 2½(−) | 2½(−) | 3½(−) |
| Residual carbon, wt. percent | 3.10 | 2.90 | 2.87 | 2.85 | 2.85 |
| Viscosity index | −75 | −69 | −72 | −68 | −67 |
| Aniline point | 30.1 | 29.8 | 30.0 | 29.7 | 29.9 |
| Refractive index, $n_D^{20}$ | 1.5839 | 1.5836 | 1.5838 | 1.5835 | 1.5836 |
| Viscosity, cst., at: | | | | | |
| 37.8° C | 1281 | 1276 | 1253 | 1192 | 1249 |
| 98.9° C | 27.1 | 26.0 | 26.2 | 25.8 | 25.8 |
| Elementary analysis, percent: | | | | | |
| S | 5.12 | 5.00 | 4.95 | 4.90 | 4.90 |
| N | 0.09 | 0.09 | 0.09 | 0.08 | 0.08 |

EXAMPLE 5

Example 3 was repeated according to the same procedures and employing the same material oil and reaction conditions as described therein except that various oxidation temperatures of 180° C., 200° C., 250° C. and 280° C. were employed. The results are shown in Table 5. The Table 5 shows that as the temperature is increased, the residual carbon and contents of sulfur and nitrogen are decreased, accompanied by lowering in the pour point and viscosity, with an enhancement in the viscosity index to give mineral oil of a high degree of purification.

TABLE 5

| Oxidation temperature (° C.) | 180 | 200 | 250 | 280 |
|---|---|---|---|---|
| Specific gravity, $d_4^{20}$ | 0.949 | 0.944 | 0.943 | 0.943 |
| Pour point, ° C | −14 | −16 | −18 | −17 |
| Flash point, ° C | | | | |
| Color phase (UNION) | 3½(−) | 3(−) | 2½(−) | 2½(−) |
| Residual carbon, wt. percent | 0.08 | 0.07 | 0.07 | 0.06 |
| Viscosity index | −38 | −32 | −30 | −28 |
| Aniline point | 68 | 72 | 75 | 74 |
| Refractive index, $n_D^{20}$ | 1.5298 | 1.5295 | 1.5287 | 1.5285 |
| Viscosity, cst., at: | | | | |
| 37.8° C | 311.2 | 310.5 | 310.9 | 311.2 |
| 98.9° C | 13.1 | 12.9 | 13.4 | 13.2 |
| Elementary analysis, percent: | | | | |
| S | 0.17 | 0.16 | 0.15 | 0.23 |
| N | 0.04 | 0.03 | 0.03 | 0.02 |

Although this application is a continuation-in-part of my prior application, as indicated hereinabove, the invention of the said prior application or any aspect thereof is not abandoned and the disclosure and claims of said prior application are herein specifically incorporated by reference as disclosure which may be referred to and utilized for purposes of this application.

What I claim is:

1. A process for the purification of mineral oil including a lube fraction comprising: reacting said mineral oil with oxygen-containing gases in the presence of at least one member selected from the group consisting of sulfuric acid and phosphoric acid as a catalyst at a temperature ranging from 180° C. to 280° C., thereby converting unstable compounds such as sulfur-containing compounds, oxygen-containing compounds, nitrogen-containing compounds, and organometallic compounds present in said mineral oil into compounds of greater molecular weight and increased polarity and separating said compounds from said mineral oil by vacuum distillation to obtain a refined mineral oil product, and further treating said refined mineral oil product in a fixed bed, suspension bed, or fluidized bed with a conventional hydrogenating catalyst under hydrogen pressure at a temperature ranging from 150° C. to 450° C.

2. The process of claim 1 wherein oxygen-containing gases comprise oxygen and air.

3. The process of claim 1 wherein at least one member selected from the group consisting of sulfuric acid and phosphoric acid is added to said mineral oil in an amount of from 0.1 wt. percent to 5.0 wt. percent on the basis of the weight of the mineral oil.

References Cited
UNITED STATES PATENTS

| | | | |
|---|---|---|---|
| 1,272,979 | 7/1918 | Maitland | 208—266 |
| 1,927,823 | 9/1933 | Davis et al. | 208—3 |
| 2,370,228 | 2/1945 | Bruun et al. | 208—3 |
| 2,944,015 | 7/1960 | Rausch et al. | 208—211 |
| 2,973,315 | 2/1961 | Watson | 208—211 |
| 3,284,342 | 11/1966 | Nathan et al. | 208—208 R |
| 3,341,448 | 9/1967 | Ford et al. | 208—208 R |

DELBERT E. GANTZ, Primary Examiner

G. J. CRASANAKIS, Assistant Examiner

U.S. Cl. X.R.

208—3